(12) United States Patent
Dilworth et al.

(10) Patent No.: US 7,553,102 B2
(45) Date of Patent: Jun. 30, 2009

(54) SELF-CENTERING CLAMP BLOCK

(75) Inventors: Damon E. Dilworth, Fort Wayne, IN (US); Allen G. Renfrow, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/426,476

(22) Filed: Jun. 26, 2006

(65) Prior Publication Data

US 2007/0297852 A1    Dec. 27, 2007

(51) Int. Cl.
*E04G 7/18* (2006.01)

(52) U.S. Cl. .................. 403/398; 403/188; 403/344

(58) Field of Classification Search ........... 403/188, 403/195, 196, 310, 311, 312, 313, 344, 398, 403/399, 289, 290; 285/67, 325, 411, 414, 285/415

See application file for complete search history.

(56) References Cited

U.S. PATENT DOCUMENTS

| | | | | |
|---|---|---|---|---|
| 772,634 A * | 10/1904 | Snyder | ............. | 403/344 |
| 918,078 A * | 4/1909 | McCaffrey | ............. | 403/344 |
| 1,913,030 A * | 6/1933 | Hux | ............. | 285/415 |
| 2,145,864 A * | 2/1939 | Denneen et al. | ............. | 148/526 |
| 3,582,029 A | 6/1971 | Moesta | | |
| 4,688,446 A * | 8/1987 | Ishikawa | ............. | 74/579 E |
| 5,531,536 A * | 7/1996 | Blanchfield et al. | ......... | 403/344 |
| 5,857,800 A * | 1/1999 | Nell | ............. | 403/344 |

* cited by examiner

*Primary Examiner*—Michael P Ferguson
(74) *Attorney, Agent, or Firm*—Jeffrey P. Calfa; Mark C. Bach

(57) ABSTRACT

A clamp member for a suspension system of a vehicle includes a base having a length, a width and a depth. The base also has an inside surface and an outside surface, and a front surface and a back surface. A semi-cylindrical receiving portion is disposed on the inside surface of the base and extends through the depth of the base. A first joint portion is disposed on the base and has a first finger extending from the inside surface in the width direction. The first finger is offset in the depth direction from the back surface. A second joint portion is disposed on the base on the opposite side of the semi-cylindrical receiving portion from the first joint portion. The second joint portion has a second finger extending from the inside surface in the width direction, and is offset in the depth direction from the front surface.

16 Claims, 2 Drawing Sheets

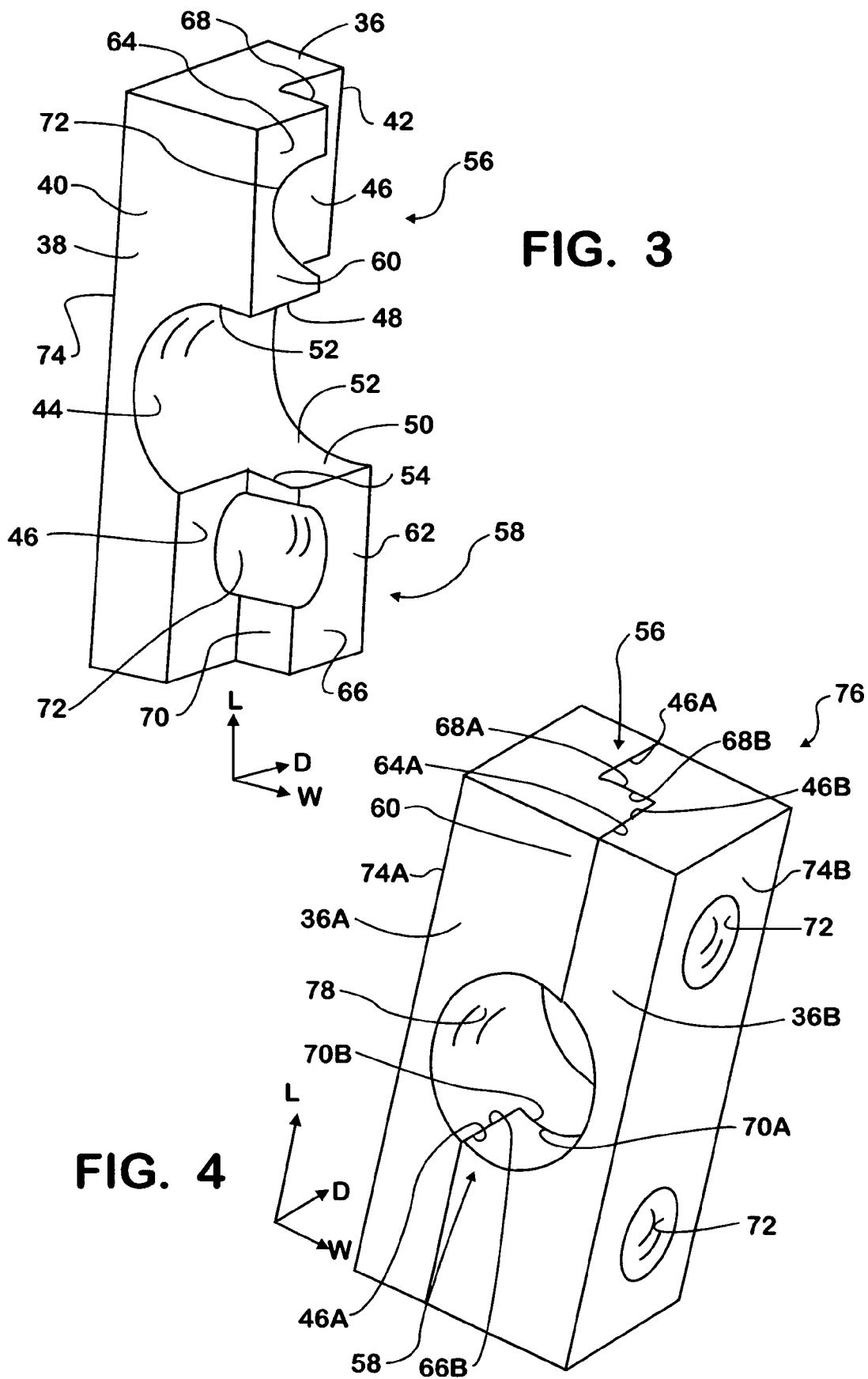

SELF-CENTERING CLAMP BLOCK

BACKGROUND OF THE INVENTION

The present invention relates generally to clamp blocks used in vehicles. More specifically, the present invention relates to clamp blocks for vehicle suspension systems that center themselves.

The use of a capture assembly in a suspension system of a vehicle is known. The capture assembly has clamp blocks that capture a bar pin that extends from a torque box. The clamp blocks attach the bar pin to a fixed support, such as an axle tower. Shims are used to secure the clamp blocks tightly against the bar pin.

A problem with the conventional capture assembly is that the clamp blocks twist and/or spread apart from each other. The twisting and/or spreading of the clamp blocks occurs under the weight of the bar pin, which is bearing the weight of the axle and the torque box. The bar pin pushes downward on the clamp blocks, which tends to push the clamp blocks apart as well as twist them, leaving little to no gap to insert shims.

Thus, there is a need for a clamp block assembly that remains centered around the bar pin.

BRIEF SUMMARY OF THE INVENTION

The above-listed needs are met or exceeded by the present clamp member for a suspension system of a vehicle that includes a base having a length, a width and a depth. The base also has an inside surface and an outside surface, and a front surface and a back surface. A semi-cylindrical receiving portion is disposed on the inside surface of the base and extends through the depth of the base. A first joint portion is disposed on the base and has a first finger extending from the inside surface in the width direction. The first finger is offset in the depth direction from the back surface. A second joint portion is disposed on the base on the opposite side of the semi-cylindrical receiving portion from the first joint portion. The second joint portion has a second finger extending from the inside surface in the width direction, and is offset in the depth direction from the front surface.

An alternate embodiment of a clamp block for a suspension system of a vehicle includes a base having a length, a width and a depth. The base has an inside surface and an outside surface opposite the inside surface, and a front surface and a back surface opposite the front surface. A semi-cylindrical receiving portion is disposed on the inside surface of the base and extends from the front surface to the back surface. The semi-cylindrical receiving portion has a first extension portion extending in the width direction and is offset from the back surface. A second extension portion extends in the width direction and is offset from the front surface. The clamp block also includes a first joint portion disposed on the base and having a first finger extending from the inside surface in the width direction, and a second joint portion disposed on the base on the opposite side of the semi-cylindrical receiving portion. The second joint portion also has a second finger extending from the inside surface in the width direction.

A clamp block assembly for receiving a bar pin in a suspension system of a vehicle includes a first clamp member having a base with a receiving portion located on an inside surface of the base. The receiving portion is configured for receiving the bar pin. The inside surface has a first joint portion and a second joint portion on either side of the receiving portion. The first joint portion has a first finger and the second joint portion has a second finger offset in the depth direction from the first finger. The clamp block assembly also has a second clamp member having a second base with a second receiving portion located on a second inside surface of the second base. The second receiving portion is configured for receiving the bar pin. The second inside surface has a third joint portion and a fourth joint portion on either side of the second receiving portion. The third joint portion has a third finger and the fourth joint portion has a fourth finger offset in the depth direction from the third finger. In the clamp block assembly, the first clamp member and the second clamp member are engageable at the first and second inside surfaces. The first finger interlocks with the third finger and the second finger interlocks with the fourth finger to prevent separation of the first and second clamp members in the depth direction.

BRIEF DESCRIPTION OF THE SEVERAL VIEWS OF THE DRAWINGS

FIG. 3 is a perspective view of a clamp block made in accordance with the present invention;

FIG. 4 is a perspective view of a clamp block assembly of the clamp blocks of FIG. 3 interlocked together.

DETAILED DESCRIPTION OF THE INVENTION

Figure 1:
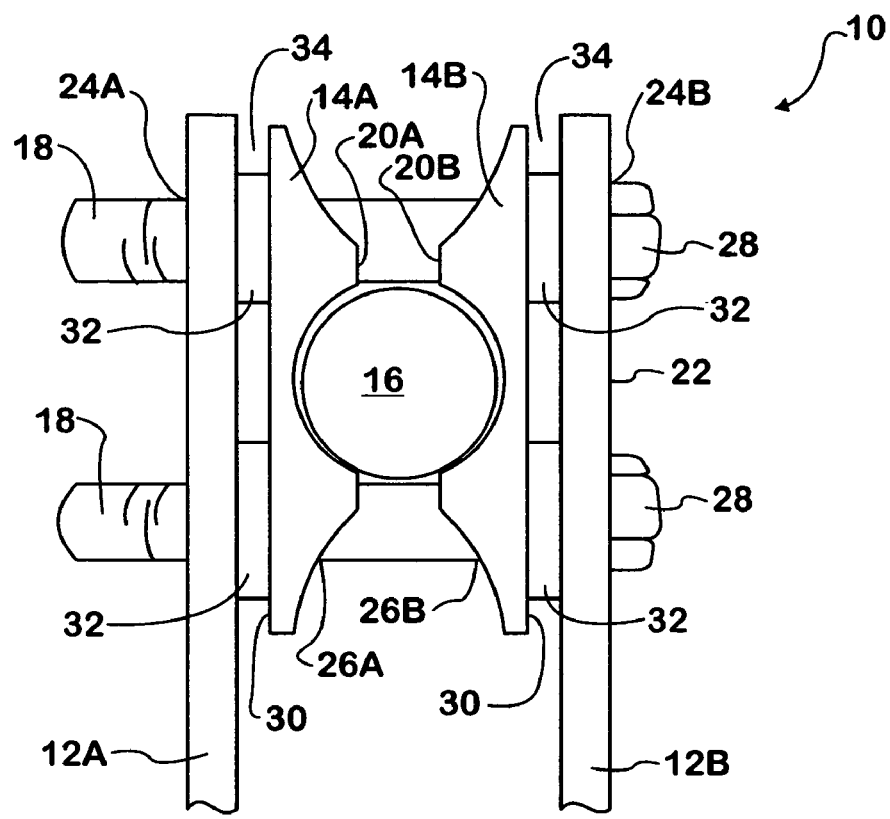
FIG. 1 is a front view of a conventional capture assembly for capturing a bar pin of a torque box.
Figure 2:
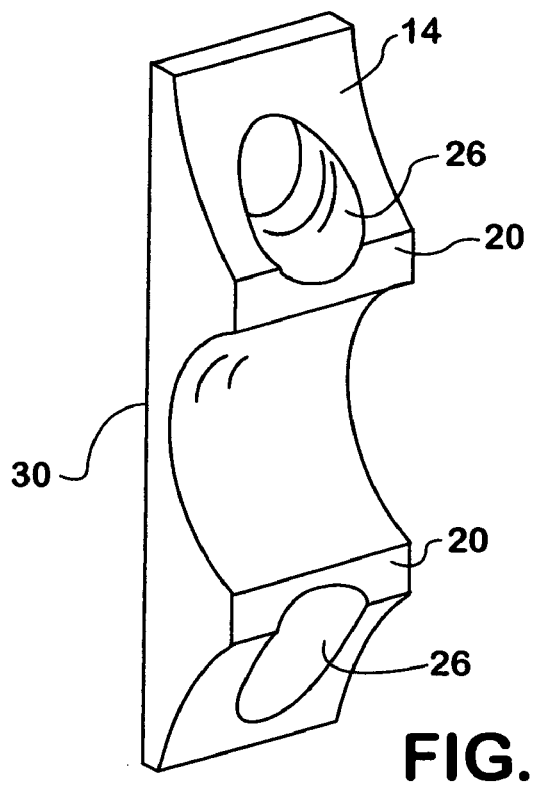
FIG. 2 is a perspective view of a conventional clamp block of the capture assembly of FIG. 1.

Referring now to FIGS. 1 and 2, a capture assembly for a suspension system of a vehicle (not shown) is indicated generally at 10. The capture assembly 10 includes two axle towers 12A, 12B having a pair of clamp blocks 14A, 14B disposed between the axle towers. The clamp blocks 14A, 14B are located on two sides of a bar pin 16 and are fixed in place with respect to the axle towers 12A, 12B with at least two fasteners 18. With the clamp blocks 14A, 14B, the capture assembly 10 captures the bar pin 16 of the torque box (not shown) between two opposing, inside surfaces 20A, 20B of the clamp blocks.

The fasteners 18 are inserted from an outside surface 22 of one of the axle towers 12B through a tower hole 24B, through a fastener hole 26B in the first clamp block 14B, through a second fastener hole 26A in the second clamp block 14A, and through a second tower hole 24A in the second tower 12A. The fastener 18 is preferably threaded to receive a securement member, such as a bolt 28, to secure the fastener to the axle tower 12.

The conventional capture assembly 10 is assembled with the torque box (not shown) by providing a fixture or jig (not shown) to hold the clamp blocks 14A, 14B generally vertically and spaced from each other. Then, when the suspension and chassis (not shown) is placed onto the axles (not shown), the fixture or jig holding the clamp blocks 14A, 14B locates the bar pin 16 between the clamp blocks. The axle towers 12A, 12B are then positioned on each outside surface 30A, 30B of the two clamp blocks 14A, 14B and the fasteners 18 are fed through the axle towers and the clamp blocks. The fasteners 18 are secured into place with the bolt 28. Then, slotted shims 32 are then placed between the clamp blocks 14A, 14B and the axle towers 12A, 12B in a gap 34 to push the clamp blocks towards each other and against the bar pin 16.

However, in the conventional capture assembly 10, the weight of the axle and the torque box (not shown) causes the bar pin 16 to push downward on the clamp blocks 14A, 14B. The weight of the axle and torque box acting through the bar pin 16 causes the clamp blocks 14A, 14B to twist and/or spread apart from each other as the bar pin pushes them apart.

When the clamp blocks 14A, 14B twist and/or spread apart, the gap 34 becomes uneven or is reduced to the extent that the shims 32 cannot be placed in the capture assembly 10. When the gap 34 is not uniform and wide enough, the shims 32 cannot be received and the bar pin 16 cannot be tightly gripped by the clamp blocks 14A, 14B. Further, without the shims 32, it is difficult to properly align the suspension.

Referring now to FIG. 3, a clamp block 36 for use in a capture assembly 10 has a base 38 having a length, a width and a depth, as indicated in FIGS. 3 and 4. The base 38 has a front surface 40 and a back surface 42 opposite the front surface. Preferably, the front surface 40 and the back surface 42 are generally parallel surfaces.

A semi-cylindrical receiving portion 44 is located on an inside surface 46 of the base 38. The semi-cylindrical receiving portion 44 extends through the base 38 from the front surface 40 to the back surface 42 in the depth direction, and is configured to receive the bar pin 16.

The semi-cylindrical receiving portion 44 has a first extension portion 48 at the front surface 40. The first extension portion 48 extends from the base 38 in the width direction and also extends in the depth direction. Preferably, the first extension portion 48 extends less than the total depth of the base 38 and is offset from the back surface 42.

On the opposite side of the semi-cylindrical receiving portion 44, a second extension portion 50 is located at the back surface 42. The second extension portion 50 extends from the base 38 in the width direction and in the depth direction, preferably less than the total depth of the base, and is offset from the front surface 40.

Preferably, the first extension portion 48 and the second extension portion 50 extend in the depth direction generally half of the depth of the base 38. Further, preferably the first extension portion 48 and the second extension portion 50 extend in the width direction the same distance. Further still, the first extension portion 48 and the second extension portion 50 are offset from each other in the depth direction.

The first and the second extension portions 48, 50 have a contoured or cylindrical surface 52 that is preferably a continuation of the surface of the semi-cylindrical receiving portion 44. The radius of the semi-cylindrical receiving portion 44 (including the first extension portion 48) at the front surface 40 is preferably about 180-degrees. Additionally, the radius of the semi-cylindrical receiving portion 44 (including the second extension portion 50) at the back surface 42 is preferably about 180-degrees. Preferably, the contoured surface 52 at the second extension portion 50 slopes downward to a trough 54 and then slopes upward as it extends in the width direction from the base 38. In this configuration, the semi-cylindrical receiving portion 44 including the second extension portion 50 is configured to cradle the bar pin 16.

The radius of the semi-cylindrical receiving portion 44 at the back surface 42 is partially superimposed and partially offset from the radius of the receiving portion at the front surface 40. In this configuration, the total radius of the semi-cylindrical receiving portion 44 (as measured from the first extension portion 48 to the second extension portion 50) preferably exceeds 180-degrees. With the radius exceeding 180-degrees, the semi-cylindrical receiving portion 44 engages more than 180-degrees of the bar pin 16 to more positively engage the bar pin 16. Since the bar pin 16 is engaged by the semi-cylindrical receiving portion 44 over more than 180-degrees of the bar pin, the bar pin must be introduced into the semi-cylindrical receiving portion by sliding it through the clamp block 36 at either the front surface 40 or the back surface 42.

On either side of the semi-cylindrical receiving portion 44 is a first joint portion 56 and second joint portion 58. The first joint portion 56 is disposed on the base 38 and has a first finger 60 extending from the inside surface 46 of the base in the width direction. Preferably, the first finger 60 is integrally formed with the first extension portion 48 and extends in the length direction away from the contoured surface 52. The first finger 60 is offset from the back surface 42 in the depth direction.

The second joint portion 58 is located on the base 38 on the opposite side of the semi-cylindrical receiving portion 44 from the first joint portion 56. The second joint portion 58 has a second finger 62 that is preferably integrally formed with and extends from the second extension portion 50 in the length direction. The second joint portion 58 also extends from the inside surface 46 of the base 38 in the width direction, and is offset in the depth direction from the front surface 40.

In the preferred embodiment, a first finger surface 64 on the first finger 60 and a second finger surface 66 of the second finger 62 are preferably parallel to each other. Additionally, a first interlocking surface 68 on the first finger 60 and a second interlocking surface 70 on the second finger 62 are generally parallel to each other. Further, the first interlocking surface 68 and the second interlocking surface 70 are generally perpendicular to the first finger surface 64 and the second finger surface 66, respectively.

At least one fastener hole 72 is located in the base 38 and extends in the width direction from the inside surface 46 to an outside surface 74. Preferably, there are two fastener holes 72 that are located generally centrally at the first and the second joint portions 56, 58. In the preferred embodiment, the fastener hole 72 is partially defined by the finger 60, 62 at the finger surface 64, 66 and the interlocking surface 68, 70. Further, the fastener hole 72 is partially defined by the base 38 at the inside surface 46.

Referring now to FIGS. 3 and 4, two generally similar clamp blocks 36A, 36B are assembled together in an interlocking position to form a clamp block assembly 76. In the preferred embodiment, the first clamp block 36A is positioned as seen in FIG. 3, and the second clamp block 36B is rotated 180-degrees about the length direction and is positioned to oppose the first clamp block. Together, the first clamp block 36A and the second clamp block 36B preferably define a full-cylindrical receiving portion 78 for receiving a bar pin 16. Further, the clamp block assembly 76 preferably defines a fastener hole 72 that extends from the outside surface 74A of the first clamp block 36A to the outside surface 74B of the second clamp block 36B.

In the interlocking position, the first interlocking surface 68A of the first clamp block 36A engages the first interlocking surface 68B of the second clamp block 36B. Likewise, the second interlocking surface 70A of the first clamp block 36A engages the second interlocking surface 70B of the second clamp block 36B. Further, the first finger surface 64A of the first clamp block 36A engages the inside surface 46B of the first joint portion 56B of the second clamp block 36B. Likewise, the inside surface 46A of the first clamp block 36A engages the second finger surface 66B of the second joint portion 58B.

The capture assembly 10 is assembled by taking two of the present clamp blocks 36A, 36B and interlocking them. Preferably, the clamp blocks 36 are made of cast steel with machined fastener holes 72, however other materials and methods of manufacture are contemplated. The two interlocked clamp blocks 36A, 36B are then slid onto end of the bar pin 16 in a tight-fit engagement. Preferably, when the clamp blocks 36A, 36B are slid onto the bar pin 16, the engagement is so tight that the clamp block assembly 76 is static with respect to the bar pin. When the suspension is lowered onto the axles, and thus the bar pin 16 pushes down on the clamp block assembly 76, the clamp blocks 36A, 36B do not separate due to the interlocking arrangement. Fasteners 18 are introduced through the fastener holes 72 and are secured with a securement device, such as a bolt 28.

Due to the interlocking engagement between the first clamp block 36A and the second clamp block 36B, the clamp blocks to not separate from each other or twist in the depth direction. Further, since the bar pin 16 is engaged by the cylindrical receiving portion 44, which extends with the second extension portion 50 underneath to cradle the bar pin 16, the weight of the bar pin (i.e. the weight of the axle and torque box) does not cause the first and the second clamp blocks 36A, 36B to separate or twist in the width direction. Since the first and second clamp blocks 36A, 36B stay in the interlocked position, the shims 32 can be inserted between the axle towers 12 and the outside surfaces 74A, 74B of the clamp assembly.

While particular embodiments of the present clamp block 36 and clamp block assembly 76 have been shown and described, it will be appreciated by those skilled in the art that changes and modifications may be made thereto without departing from the invention in its broader aspects and as set forth in the following claims.

We claim:

1. A clamp block assembly for a suspension system of a vehicle, comprising:
   two opposing clamp block members, each comprising:
      a base having a length, a width and a depth, said base having an inside surface and an outside surface opposite said inside surface, and a front surface and a back surface opposite said front surface;
      a semi-cylindrical receiving portion disposed on said inside surface of said base and extending from said front surface to said back surface;
      a first joint portion disposed on said base on a side of said semi-cylindrical receiving portion and having a first finger extending from said inside surface in the width direction, said first finger offset in the depth direction from said back surface;
      a second joint portion disposed on said base on the opposite side of said semi-cylindrical receiving portion from said first joint portion, said second joint portion having a second finger extending from said inside surface in the width direction, and offset in the depth direction from said front surface; and
      at least one fastener hole located in said base and extending in the width direction from said inside surface to said outside surface and non-intersecting with said receiving portion;
      wherein said receiving portion comprises the entire inside surface of said base extending along an arcuate inside surface between and including said first finger and said second finger;
   a bar pin received in said semi-cylindrical receiving portion of both clamp block members;
   a first axle tower and a second axle tower each disposed outwardly upon said outside surface of one of said clamp block members with respect to said bar pin; and
   at least one fastener disposed through said first axle tower, through said at least one fastener hole of both clamp blocks, and through said second axle tower such that said first finger of one of said clamp block members interlocks with said second finger of the other clamp block member to clamp said bar pin between said clamp block members.

2. The clamp block assembly of claim 1 wherein said semi-cylindrical receiving portion further comprises a first extension portion extending from said base in the width direction.

3. The clamp block assembly of claim 2 wherein said first extension portion is offset from said back surface.

4. The clamp block assembly of claim 2 wherein said semi-cylindrical receiving portion further comprises a second extension portion extending from said base in the width direction.

5. The clamp block assembly of claim 4 wherein said second extension portion is offset from said front surface.

6. The clamp block assembly of claim 4 wherein the arc length of said semi-cylindrical receiving portion from said first extension portion to said second extension portion is greater than 180-degrees.

7. The clamp block assembly of claim 1 further comprising a first finger surface on said first finger and a second finger surface on said second finger, wherein said first finger surface and said second finger surface are parallel to each other.

8. The clamp block assembly of claim 7 further comprising a first interlocking surface on said first finger end a second interlocking surface on said second finger, wherein said first interlocking surface is generally perpendicular to said first finger surface and said second interlocking surface is generally perpendicular to said second finger surface.

9. A clamp block assembly for a suspension system of a vehicle, comprising:
   two opposing clamp blocks members, each comprising:
      a base having a length, a width and a depth, said base having an inside surface and an outside surface opposite said inside surface, and a front surface and a back surface opposite said front surface, wherein said outside surface is generally planar;
      a semi-cylindrical receiving portion disposed on said inside surface of said base and extending from said front surface to said back surface, said semi-cylindrical receiving portion haying a first extension portion extending in the width direction and offset from said back surface, and a second extension portion extending in the width direction and offset from said front surface;
      a first joint portion disposed on said base on a side of said semi-cylindrical receiving portion and having a first finger extending from said inside surface in the width direction;
      a second joint portion disposed on said base on the opposite side of said semi-cylindrical receiving portion, said second joint portion having a second finger extending from said inside surface in the width direction; and
      at least one fastener hole located in said base and extending in the width direction from said inside surface to said outside surface and non-intersecting with said receiving portion;
      wherein said receiving portion comprises the entire inside surface of said base extending along an arcuate inside surface between and including said first finger and said second finger;
   a bar pin received in said semi-cylindrical receiving portion of both clamp block members;
   a first axle tower and a second axle tower each disposed outwardly upon said outside surface of one of said clamp block members with respect to said bar pin; and at least one fastener disposed through said first axle tower, through said at least one fastener hole of both clamp block members, and through said second axle tower such that said first finger of one of said clamp block members interlocks with said second finger of the other clamp block member to clamp said bar pin between said clamp block members.

10. The clamp block assembly of claim 9 wherein said first finger is offset in the depth direction from said back surface.

11. The clamp block assembly of claim 9 wherein said second finger is offset in the depth direction from said front surface.

12. The clamp block assembly of claim 9 wherein the arc length of said semi-cylindrical receiving portion from said first extension portion to said second extension portion is greater than 180-degrees.

13. The clamp block assembly of claim 9 wherein said first finger and said second finger are offset from each other in the depth direction.

14. The clamp block assembly of claim 9 further comprising a first finger surface on said first finger and a second finger surface on said second finger, wherein said first finger surface and said second finger surface are parallel to each other.

15. The clamp block assembly of claim 14 further comprising a first interlocking surface on said first finger and a second interlocking surface on said second finger, wherein said first interlocking surface is generally perpendicular to said first finger surface and said second interlocking surface is generally perpendicular to said second finger surface.

16. A clamp block assembly for a suspension system of a vehicle, comprising:
   a first clamp having a length, a width and a depth, said base having an inside surface and an outside surface opposite said inside surface, with a first with a receiving portion located on said inside surface of said base, said receiving portion configured for receiving a bar pin, said inside surface having a first joint portion and a second joint portion on opposite sides of said receiving portion, wherein said first joint portion has a first finger and said second joint portion has a second finger offset in the depth direction from said first finger;
   a second clamp member having a second base having a length, a width and a depth, said base having a second inside surface and a second outside surface opposite said second inside surface, with a second receiving portion located on said second inside surface of said second base, said second receiving portion configured for receiving the bar pin, said second inside surface having a third joint portion and a fourth joint portion on opposite sides of said second receiving portion, wherein said third joint portion has a third finger and said fourth joint portion has a fourth finger offset in the depth direction from said third finger; and
   at least one fastener hole located in each of said first base and said second base, each fastener hole extending in a width direction from said inside surface to said outside surface and non-intersecting with said receiving portion of each respective base;
   wherein said first clamp member and said second clamp member are engageable at said first and second inside surfaces, wherein said first finger interlocks with said third finger and said second finger interlocks with said fourth finger to prevent separation of said first and second clamp members in the depth direction;
   wherein said first receiving portion comprises the entire inside surface of said base extending along an arcuate inside surface between and including said first finger and said second finger, and said second receiving portion comprises the entire surface of said second base extending along a second arcuate inside surface between and including said third finger and said fourth finger;
   a bar pin received in said first receiving portion of said first clamp member and said second receiving portion of said second clamp member;
   a first axle tower and a second axle tower each disposed outwardly upon one of said first clamp member and said second clamp member with respect to said bar pin; and
   at least one fastener disposed through said first axle tower, through said at least one fastener hole of said first clamp member, through said at least one fastener hole of said second clamp member, and through said second axle tower such that said first finger of said first clamp member interlocks with said fourth finger of said second clamp member and said second finger of said first clamp member interlocks with said third finger of said second clamp member to clamp said bar pin between said first and second clamp members.

* * * * *